United States Patent [19]
Butsuen et al.

[11] Patent Number: 5,269,557
[45] Date of Patent: * Dec. 14, 1993

[54] SUSPENSION SYSTEM FOR A VEHICLE

[75] Inventors: Tetsuro Butsuen; Yasunori Yamamoto; Tohru Yoshioka, all of Hiroshima, Japan

[73] Assignee: Mazda Motor Corporation, Hiroshima, Japan

[*] Notice: The portion of the term of this patent subsequent to Dec. 22, 2009 has been disclaimed.

[21] Appl. No.: 783,183

[22] Filed: Oct. 28, 1991

[30] Foreign Application Priority Data

Oct. 26, 1990 [JP] Japan .................. 2-289750

[51] Int. Cl.$^5$ .............................. B60G 11/26
[52] U.S. Cl. .................... 280/707; 280/714; 364/424.05; 188/299
[58] Field of Search ............... 364/424.05; 188/319, 188/299; 280/707, 703, 714, 709

[56] References Cited

U.S. PATENT DOCUMENTS

| | | | |
|---|---|---|---|
| 4,191,281 | 3/1980 | Nishikawa et al. | 188/319 |
| 4,696,489 | 9/1987 | Fujishiro et al. | 280/703 |
| 4,742,998 | 5/1988 | Schubert | 267/136 |
| 4,887,699 | 12/1989 | Ivers et al. | 280/707 |
| 4,905,152 | 2/1990 | Kawabata | 280/707 |
| 4,907,154 | 3/1990 | Yasuda et al. | 280/707 |
| 5,016,911 | 5/1991 | Takehara et al. | 280/708 |
| 5,172,929 | 12/1992 | Butsuen et al. | 280/707 |

FOREIGN PATENT DOCUMENTS 60-248419 12/1985 Japan .
61-163011 7/1986 Japan .

Primary Examiner—Margaret A. Focarino
Assistant Examiner—Paul Dickson
Attorney, Agent, or Firm—Thompson, Hine and Flory

[57] ABSTRACT

In a suspension system for a vehicle comprising a shock absorber of which damping force characteristics can be changed into four or more characteristics, detecting means detect the oscillation frequency range of the sprung member of the vehicle and a bumpy road. From the four or more damping force characteristics of the shock absorber, the number of characteristics on the higher level side are limited to two or so when the sprung member is in a low frequency oscillation range, that of the characteristics on the lower level side are limited to two or so when the sprung member is in a high frequency oscillation range, and that of the characteristics on the medium level side are limited to two or so when a road is bumpy. The damping force characteristic of the shock absorber is selected and changed on the basis of a given control rule only within the limited damping force characteristics. Thus, it is possible to prevent noise and oscillation from being caused by the large change of the damping force characteristic. Furthermore, there can be obtained comfortableness to ride in and stability on a high level.

9 Claims, 4 Drawing Sheets

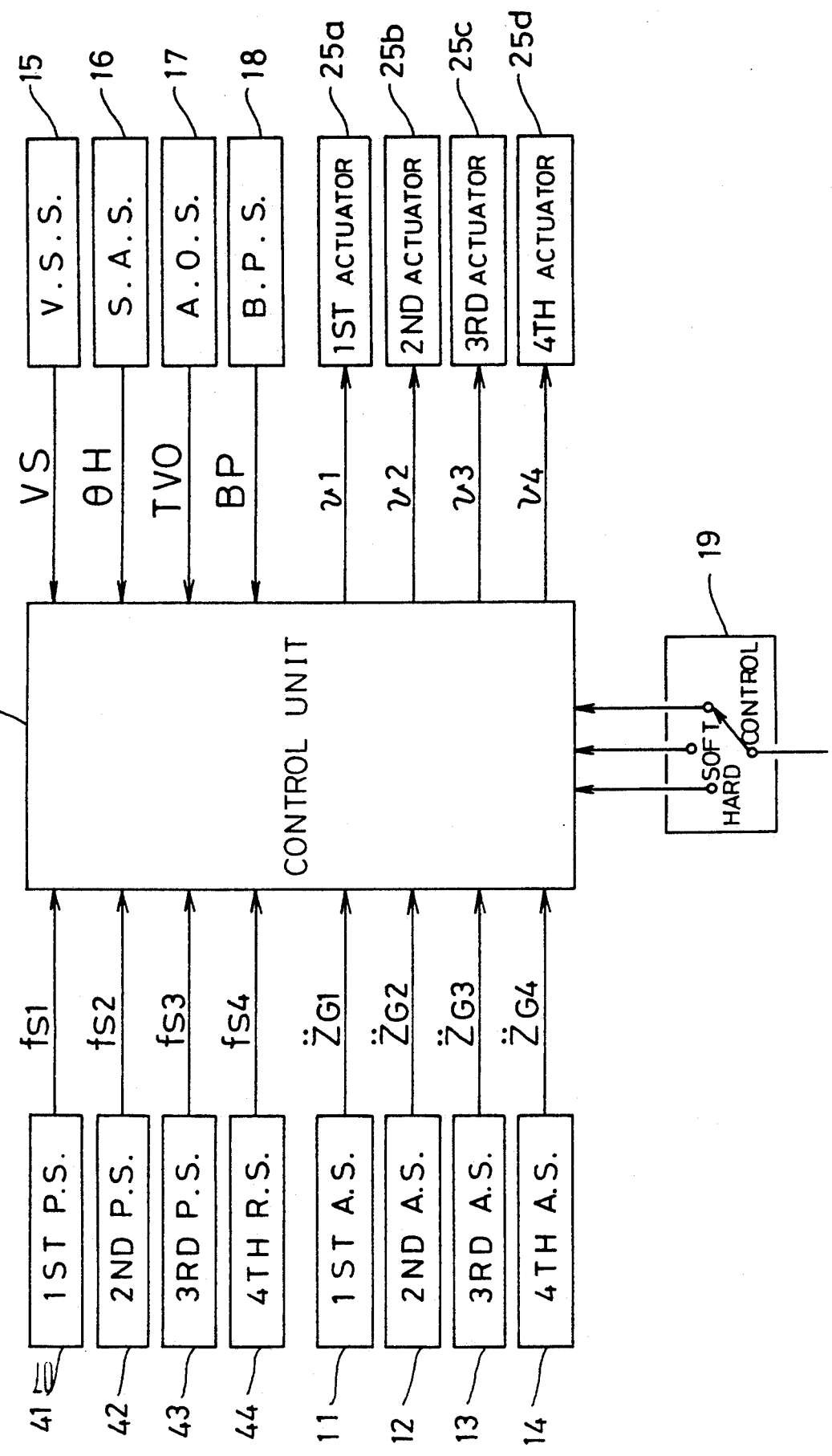

SUSPENSION SYSTEM FOR A VEHICLE

BACKGROUND OF THE INVENTION

This invention relates to a suspension system for a vehicle and more particularly to a suspension system which comprises a shock absorber of a damping force characteristic variable type provided between a sprung member and an unsprung member.

In general, the vehicle suspension system comprises a shock absorber provided between a sprung member (the body side) and an unsprung member (the wheel side) for damping the vertical oscillation of a wheel. There are various types of shock absorbers. By way of example, the shock absorbers of a damping force characteristic variable type are grouped into one which can change a damping force characteristic (characteristic of a different damping coefficient) into two steps (higher level and lower level) and another which can change the damping force characteristic into many steps or steplessly.

The shock absorber of a damping force characteristic variable type is basically controlled by setting the damping force of the shock absorber to the lower level side (i.e., SOFT side) when the damping force of the shock absorber acts in the oscillation-stimulating direction with respect to the vertical oscillation of the body and setting the damping force of the shock absorber to the higher level side (i.e., HARD side) when the damping force acts in the oscillation-restraining direction so that oscillation-restraining energy is made larger than the oscillation-stimulating energy transmitted to the sprung member. Thus, comfortableness to ride in and running stability are improved.

There have been proposed various methods for judging whether the damping force of the shock absorber acts in the oscillation-stimulating direction or the oscillation-restraining direction. For example, Japanese Patent Application Laid-Open Gazette No. 60-248419 discloses a method for judging the direction of the damping force in such a way: It is judged whether the sign of the relative displacement between the sprung member and the unsprung member is the same as that of a differentiated value thereof, which is the relative speed between the sprung member and the unsprung member. If the signs are the same, it is judged that the damping force acts in the oscillation-stimulating direction. If the signs are not the same, it is judged that the damping force acts in the oscillation-restraining direction. Also, Japanese Patent Application Laid-Open Gazette No. 61-163011 discloses a method for judging the direction of the damping force in such a way: It is judged whether the sign of the absolute speed of the sprung member is the same as that of the relative speed between the sprung member and the unsprung member. If the signs are the same, it is judged that the damping force acts in the oscillation-retraining direction. If the sings are not the same, it is judged that the damping force acts in the oscillation-stimulating direction.

However, in the vehicle having the shock absorber of a damping force characteristic multistep variable type, when the damping force characteristic is changed and controlled to generate an approximately ideal damping force, loud noise and oscillation are caused by the large change of the damping force characteristic of the shock absorber.

SUMMARY OF THE INVENTION

It is an object of the present invention to prevent noise and oscillation from being caused by the large change of a damping force characteristic while suitably showing the damping performance of a shock absorber, of which damping force characteristic can be changed in multistep, according to a road surface and the oscillation of the sprung member of a vehicle.

To achieve the above-mentioned object, the present invention provides a suspension system for a vehicle having the following construction.

The suspension system for a vehicle comprises a shock absorber provided between a sprung member and an unsprung member for changing a damping force characteristic into four or more characteristics, oscillation frequency range detecting means for detecting the oscillation frequency range of the sprung member of the vehicle, bumpy road detecting means for detecting a bumpy road, damping force characteristic limiting means for receiving signals from the oscillation frequency range detecting means and the bumpy road detecting means so as to limit the damping force characteristics of the shock absorber to the higher level side when the sprung member is in a low frequency oscillation range, to the lower level side when the sprung member is in a high frequency oscillation range, and to the medium level side when the road is bumpy, and damping force characteristic changing and controlling means for changing and controlling the damping force characteristic of the shock absorber on the basis of a given control rule only within the damping force characteristics limited by the damping force characteristic limiting means.

With the above-mentioned construction, the oscillating state of the sprung member of the vehicle is detected by the oscillation frequency range detecting means. In addition, the bumpy road is detected by the bumpy road detecting means. The damping force characteristic limiting means receives the signals from both detecting means so as to limit the number of the damping force characteristics of the shock absorber to four or less according to the road surface and the oscillating state of the sprung member of the vehicle. In other words, when the sprung member is in the low frequency oscillation range, the damping force characteristic is limited to the higher level side in consideration of stability. When the sprung member is in the high frequency oscillation range, the damping force characteristic is limited to the lower level side in consideration of comfortableness to ride in. When the road is bumpy, the damping force characteristic is limited to the medium level side in consideration of the stability and the comfortableness to ride in. The damping force characteristic changing and controlling means selects and changes the damping force characteristic of the shock absorber on the basis of the given control rule only within the damping force characteristics limited by the damping force characteristic limiting means. Thus, there can be obtained the comfortableness to ride in and the stability on a high level. In addition, it is possible to prevent the noise and oscillation from being caused by the large change of the damping force characteristic.

The above and further objects, features and advantages of the present invention will be apparent by reading the following description with reference to the accompanying drawings.

BRIEF DESCRIPTION OF THE DRAWINGS

The accompanying drawings show a preferred embodiment of the present invention, in which:

FIG. 5 is a block diagram showing the control part of the suspension system.

DETAILED DESCRIPTION OF A PREFERRED EMBODIMENT

A preferred embodiment of the present invention will be described below with reference to the accompanying drawings.

Figure 1:
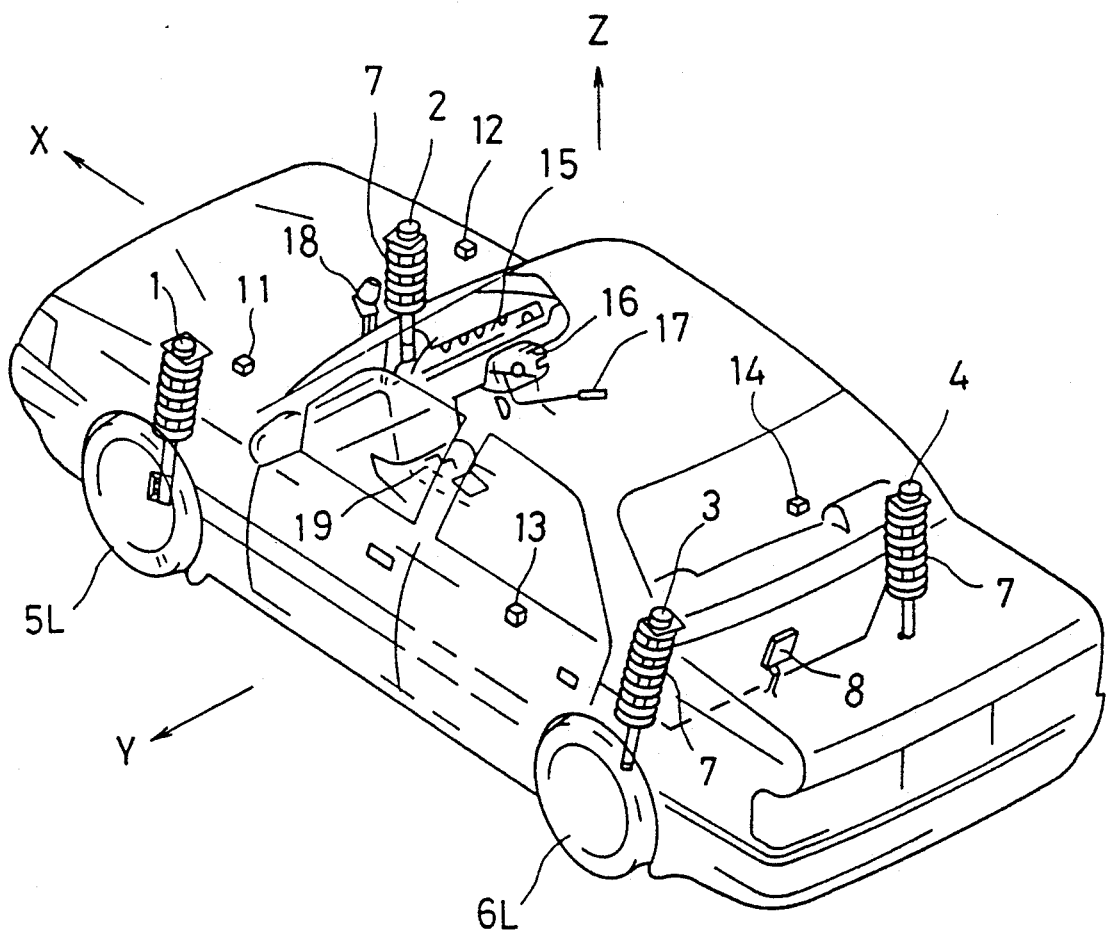
FIG. 1 is a perspective view showing the layout of components of a suspension system.

FIG. 1 shows the layout of components of a suspension system according to an embodiment of the present invention. In FIG. 1, the reference numerals 1 to 4 designate four shock absorbers, for damping the vertical oscillation of wheels, provided in right and left front wheels 5L (only a left front wheel is shown) and right and left rear wheels 6L (only a left rear wheel is shown). The shock absorbers 1 to 4 have actuators 25 (see FIGS. 2 and 3) for changing damping force characteristics of different damping coefficients into four or more characteristics (six characteristics in the present embodiment as described below) respectively, and pressure sensors (not shown) as damping force detecting means for detecting the damping force which is actually generated. The reference numeral 7 designates coil springs provided on the outer circumferences of the shock absorbers 1 to 4 at their upper parts. The reference numeral 8 designates a control unit for changing and controlling the damping force characteristics by outputting control signals to the actuators provided in the shock absorbers 1 to 4. Detection signals are outputted to the control unit 8 from the pressure sensors of the shock absorbers 1 to 4.

The reference numerals 11 to 14 designate four acceleration sensors for detecting the acceleration in the vertical direction (Z direction) of the sprung member for each wheel. The reference numeral 15 designates a vehicle speed sensor provided in the meter of an instrument panel for detecting a vehicle speed. The reference numeral 16 designates a steering angle sensor for detecting the steering angle of the front wheels by the rotation of a steering shaft. The reference numeral 17 designates an accelerator opening sensor for detecting the opening of an accelerator. The reference numeral 18 designates a brake pressure switch for checking whether a brake is under operation (i.e., whether a vehicle is braking) on the basis of a brake fluid pressure. The reference numeral 19 designates a mode selecting switch by which a driver switches the damping force characteristics of the shock absorbers 1 to 4 to either HARD, SOFT or CONTROL. Those sensors 11 to 17 and switches 18 and 19 output detection signals to the control unit 8.

Figure 2:
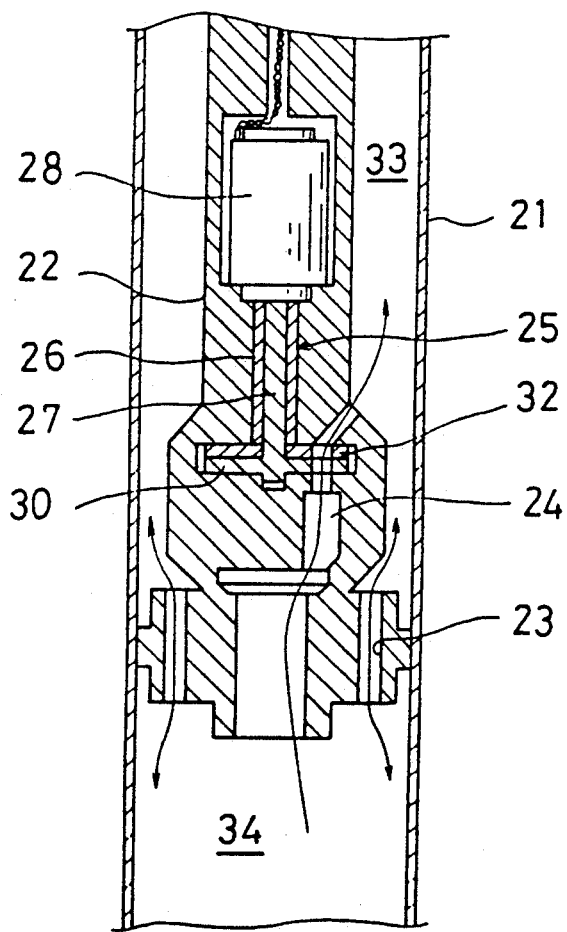
FIG. 2 is a vertically sectional side view showing the main part of a shock absorber.

FIG. 2 shows the construction of the shock absorbers 1 to 4, wherein the pressure sensors to be provided in the shock absorbers 1 to 4 are not shown. In FIG. 2, the reference numeral 21 designates a cylinder. A piston unit 22 integrally formed by a piston and a piston rod is inserted slidably in the cylinder 21. The cylinder 21 and the piston unit 22 are connected to an axle (unsprung member) or a vehicle body (sprung member) through each joint.

Figure 3:
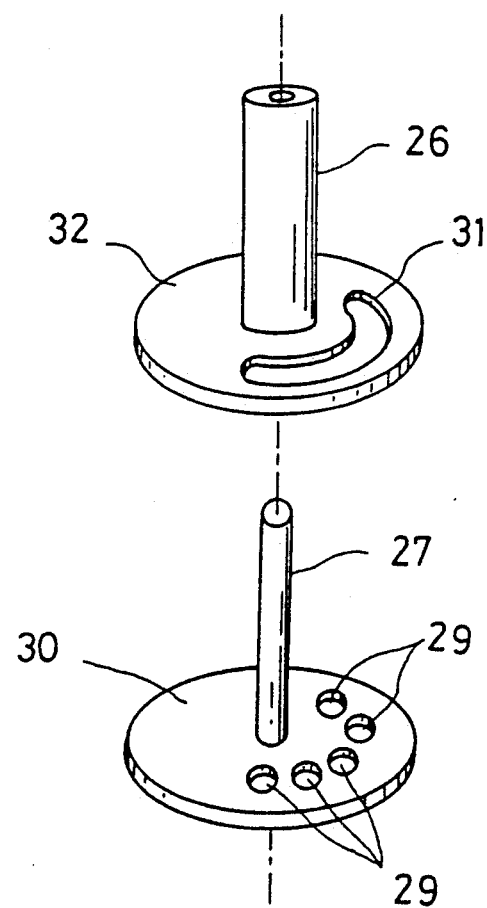
FIG. 3 is an exploded perspective view showing the construction of an actuator.

Two orifices 23 and 24 are provided in the piston unit 22. The orifice 23 is open at all times, and the throttling (passage area) of the orifice 24 can be changed into six levels by the actuator 25. Also as shown in FIG. 3, the actuator 25 includes a shaft 27 rotatably provided in the piston unit 22 through a sleeve 26, a step motor 28 for rotating the shaft 27 at a predetermined angle, a first orifice plate 30 provided integrally and rotatably with the shaft 27 at its lower end and having five round holes 29 formed at equal intervals in a circumference direction, and a second orifice plate 32 provided in the orifice 24 and having a circular long hole 31 which corresponds to the round holes 29 of the first orifice plate 30. The step motor 28 operates to rotate the first orifice plate 30. Consequently, the round holes 29 of the first orifice plate 30 are opposed to the long hole 31 of the second orifice plate 32 or not. In addition, the number of the round holes 29 opposed to the long hole 31 varies from zero to five sequentially.

An upper chamber 33 and a lower chamber 34 in the cylinder 21 and a hollow part provided in the piston unit 22 for connecting to both chambers 33 and 34 are filled with a fluid having an adequate viscosity. This fluid can flow between the upper chamber 33 and the lower chamber 34 through either the orifice 23 or 24.

With the above-mentioned construction, the shock absorbers 1 to 4 possess six damping force characteristics of different damping coefficients respectively. If five round holes 29 of the orifice plate 30 are opposed to the long hole 31 of the orifice plate 32, the damping force characteristics of the shock absorbers 1 to 4 are set to a first characteristic of the lowest damping coefficient. If four round holes 29 are opposed to the long hole 31, the damping force characteristics of the shock absorbers 1 to 4 are set to a second characteristic of a lower damping coefficient. If three round holes 29 are opposed to the long hole 31, the damping force characteristics of the shock absorbers 1 to 4 are set to a third characteristic of a slight low damping coefficient. If two round holes 29 are opposed to the long hole 31, the damping force characteristics of the shock absorbers 1 to 4 are set to a fourth characteristic of a slight high damping coefficient. If only one round hole 29 is opposed to the long hole 31, the damping force characteristics of the shock absorbers 1 to 4 are set to a fifth characteristic of a higher damping coefficient. If any round hole 29 is not opposed to the long hole 31, the orifice 24 is completely closed. Thus, the fluid can flow only through the orifice 23, so that the damping force characteristics of the shock absorbers 1 to 4 are set to a sixth characteristic of the highest damping coefficient.

Figure 4:
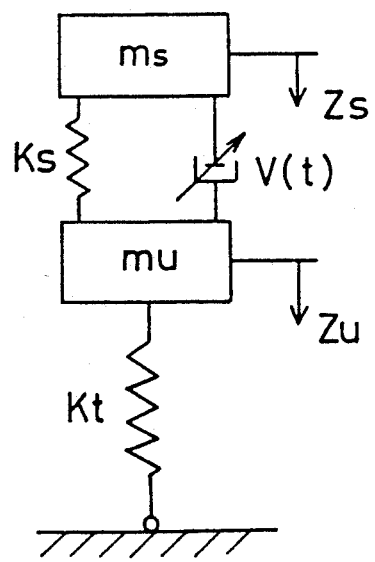
FIG. 4 is a diagram showing the oscillation model of the suspension system.

FIG. 4 shows the oscillation model of the suspension system, where ms designates a sprung-member mass, mu designates an unsprung-member mass, zs designates a sprung-member displacement, zu designates an unsprung-member displacement, ks designates the spring constant of the coil spring 7, kt designates the spring constant of a tire, and v(t) designates the damping coefficient of the shock absorber.

FIG. 5 is a block diagram showing the control part of the suspension system. In FIG. 5, a first pressure sensor 41, a first acceleration sensor 11 and a first actuator 25a correspond to a left front wheel 5L. A second pressure sensor 42, a second acceleration sensor 12 and a second actuator 25b correspond to a right front wheel. A third pressure sensor 43, a third acceleration sensor 13 and a third actuator 25c correspond to a left rear wheel 6L. A fourth pressure sensor 44, a fourth acceleration sensor 14 and a fourth actuator 25d correspond to a right rear wheel. The actuators 25a to 25d are identical with the actuator 25 in FIG. 2. The pressure sensors 41 to 44 are provided in the shock absorbers 1 to 4.

In FIG. 5, fs1 to fs4 are damping force signals which are outputted to the control unit 8 from the first to fourth pressure sensors 41 to 44. Those signals take continuous values. When the damping force acts upward, the signal is positive. When the damping force acts downward, the signal is negative.

$Z_{G1}$ to $Z_{G4}$ are vertical (Z direction) sprung-member absolute acceleration signals which are outputted to the control unit 8 from the first to fourth acceleration sensors 11 to 14. Those signals take continuous values. When the sprung member receives the upward acceleration, the signal is positive. When the sprung member receives the downward acceleration, the signal is negative.

A vehicle speed signal VS, a steering angle signal $\theta H$ and an accelerator opening signal TVO are outputted to the control unit 8 from the vehicle speed sensor 15, the steering angle sensor 16 and the accelerator opening sensor 17, respectively. Those signals take continuous values. The vehicle speed signal VS is positive when the vehicle moves forward, and it is negative when the vehicle moves rearward. The steering angle signal $\theta H$ is positive when a steering wheel turns counterclockwise from a driver's view (i.e., turns to the left), and it is negative when the steering wheel turns clockwise (i.e., turns to the right).

A brake pressure signal BP is outputted from the brake pressure switch 18 to the control unit 8, and takes two values of ON and OFF. "ON" means that the brake is under operation. "OFF" means that the brake is not under operation.

Actuator control signals v1 to v4 are outputted from the control unit 8 to the actuators 25a to 25d, and take two values of "Is" to "Ih" respectively. "Is" means that the damping force characteristics of the shock absorbers 1 to 4 are set to SOFT side. "Ih" means that the damping force characteristics of the shock absorbers 1 to 4 are set to HARD side. Both characteristics on SOFT and HARD sides take values of "1" to "6" corresponding to the characteristics to be selected from the respective six damping force characteristics (first to sixth characteristics) of the shock absorbers 1 to 4 as described below.

Moreover, mode selecting signals are outputted from the mode selecting switch 19 to the control unit 8. The mode selecting signals are a plurality of parallel signals and take three values of HARD, SOFT and CONTROL in the present embodiment. "HARD" means that a driver selects HARD mode. "SOFT" means that the driver selects SOFT mode. "CONTROL" means that the driver selects CONTROL mode. When HARD mode is selected, the damping force characteristics of the shock absorbers 1 to 4 are set HARD. When SOFT mode is selected, the damping force characteristics of the shock absorbers 1 to 4 are set SOFT. When CONTROL mode is selected, the damping force characteristics of the shock absorbers 1 to 4 are switched to either HARD or SOFT automatically and independently according to driving conditions, a road surface and the like.

Figure 6:
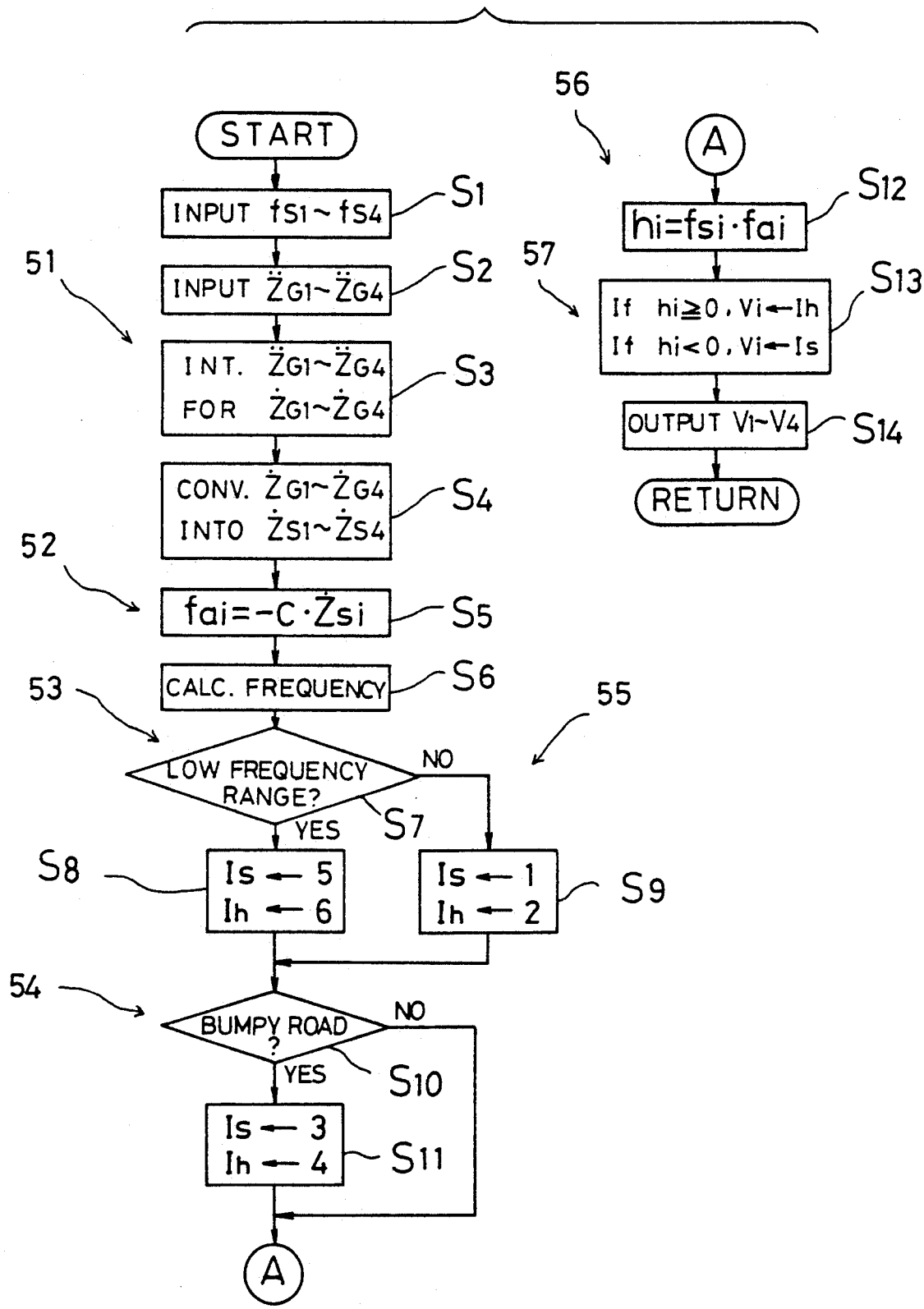
FIG. 6 is a flow chart showing control flow.

FIG. 6 shows the control flow of the control unit 8 when CONTROL mode is selected by the mode selecting switch 19. The control operation is executed by the control program of the control unit 8. The control program is repeated at regular intervals (1 to 10 ms) by the starting program provided separately. The control operation will be described below in accordance with the flow.

At Step S1, the damping force signals fs1 to fs4 are inputted. At Step S2, the sprung-member absolute acceleration signals $Z_{G1}$ to $Z_{G4}$ are inputted. At Step S3, the signals $Z_{G1}$ to $Z_{G4}$ are integrated by numerical integration or the like so as to obtain vertical body absolute speeds $Z_{G1}$ to $Z_{G4}$. Since $Z_{G1}$ to $Z_{G4}$ are vertical sprung-member absolute speeds at the acceleration sensors 11 to 14, they are converted into vertical sprung-member absolute speeds $Z_{S1}$ to $Z_{S4}$ at the shock absorbers 1 to 4 in Step S4. $Z_{S1}$ to $Z_{S4}$ can be obtained if three values of $Z_{G1}$ to $Z_{G4}$ are found. Therefore, $Z_{G1}$ to $Z_{G3}$ will be used below and $Z_{G4}$ will be a substiture. As shown in FIG. 1, an origin is properly set in a horizontal plane. The coordinates for the acceleration sensors 11 to 13 and for the shock absorbers 1 to 4 are expressed by $(x_{G1}, y_{G1})$ to $(x_{G3}, y_{G3})$ and $(x_{S1}, y_{S1})$ to $(x_{S4}, y_{S4})$, respectively. Then, $Z_{S1}$ to $Z_{S4}$ are obtained by the following formula:

$$\begin{pmatrix} Z_{S1} \\ Z_{S2} \\ Z_{S3} \\ Z_{S4} \end{pmatrix} = \begin{pmatrix} 1 & y_{S1} & -x_{S1} \\ 1 & y_{S2} & -x_{S2} \\ 1 & y_{S3} & -x_{S3} \\ 1 & y_{S4} & -x_{S4} \end{pmatrix} \begin{pmatrix} 1 & y_{G1} & -x_{G1} \\ 1 & y_{G2} & -x_{G2} \\ 1 & y_{G3} & -x_{G3} \end{pmatrix}^{-1} \begin{pmatrix} Z_{G1} \\ Z_{G2} \\ Z_{G3} \end{pmatrix}$$

where two coefficient matrixes and a product thereof are predetermined and given as constants.

Steps S2 to S4 and the acceleration sensors 11 to 14 form sprung-member absolute speed detecting means 51 for detecting the vertical sprung-member absolute speeds $Z_{S1}$ to $Z_{S4}$ at the shock absorbers 1 to 4.

At Step S5, there is obtained a skyhook damper force fai as an ideal damping force by the following formula.

$$f_{ai} = -c \cdot Z_{si} (i = 1, 2, 3, 4)$$

In other words, the skyhook damper force fai is a value which is obtained by multiplying a gain value c and a sprung-member absolute speed Zsi at each wheel together. Step S5 forms skyhook damper force calculating means 52 for calculating the skyhook damper force fai.

At step S6, a sprung-member absolute speed $Z_S$ (or its integral value, i.e., a sprung-member absolute displacement zs) is continuously measured to calculate the frequency of the sprung-member oscillation. At Step S7, it is judged whether the low frequency oscillation range is selected. Steps S6 and S7 and the acceleration sensors 11 to 14 form oscillation frequency range detecting means 53 for detecting the oscillation frequency range of the sprung member of the vehicle.

If the judgement is YES in Step S7, i.e., the low frequency oscillation range is selected, "5" and "6" are set to "Is" and "Ih" respectively at Step S8. If the judgement is NO, i.e., the high frequency oscillation range is selected, "1" and "2" are set to "Is" and "Ih" respectively at Step S9.

At Step S10, it is judged whether a road is bumpy depending on the variation of the sprung-member absolute speed $Z_S$. If the judgement is YES, i.e., the road is bumpy, "3" and "4" are set to "Is" and "Ih" respectively at Step S11. Then, this routine proceeds to Step S12. If the judgement is NO, i.e., the road is not bumpy, this routine proceeds to Step S12. Step S10 and the acceleration sensors 11 to 14 form bumpy road detecting means 54 for detecting a bumpy road. The bumpy road detecting means 54 may detect the stroke of the shock absorbers 1 to 4 (i.e., the relative displacement between the sprung member and the unsprung member (zs−zu)) in place of the variation of the sprung-member absolute speed $Z_S$ so as to correspondingly detect the bumpy road.

Steps S7 to S11 form damping force characteristic limiting means 55 for limiting the damping force characteristics of the shock absorbers 1 to 4 to the fifth and sixth characteristics on the higher level side when the sprung member is in the low frequency oscillation range, to the first and second characteristics on the lower level side when the sprung member is in the high frequency oscillation range, and to the third and forth characteristics on the medium level side when the road is bumpy.

At Step S12, there is obtained a judging function hi (=fsi·fai) as the product of an actual damping force fsi and the skyhook damper force fai for the shock absorbers 1 to 4. At Step S13, if the judging function hi is equal to or greater than zero (hi≧0), vi is made equal to Ih. If the judging function hi is smaller than zero (hi<0), vi is made equal to Is. At Step S14, the actuator control signals v1 to v4 are outputted. Then, this routine returns. Steps S12 and S13 form judging means 56 for calculating the judging function hi which is the product of the skyhook damper force fai and the actual damping force fsi so as to quantitatively judge from the judging function hi whether the damping force of the shock absorbers 1 to 4 acts in the oscillation-restraining direction or the oscillation-stimulating direction with respect to the vertical oscillation of the sprung member. Steps S13 and S14 form damping force characteristic changing and controlling means 57 for changing and controlling the damping force characteristics of the shock absorbers 1 to 4 between two damping force characteristics limited by the damping force characteristic limiting means 55 according to the acting direction of the damping force of the shock absorbers 1 to 4 judged by the judging means 56.

According to the above-mentioned control, there is obtained the judging function hi as the product of the skyhook damper force fai and the actual damping force fsi for the shock absorbers 1 to 4. If the judging function hi is equal to or greater than zero (hi≧0), i.e., the damping force of the shock absorbers 1 to 4 acts in the oscillation-restraining direction with respect to the vertical oscillation of the sprung member, the damping force characteristics of the shock absorbers 1 to 4 are changed into HARD side. If the judging function hi is smaller than zero (hi<0), i.e., the damping force of the shock absorbers 1 to 4 acts in the oscillation-stimulating direction with respect to the vertical oscillation of the sprung member, the damping force characteristics of the shock absorbers 1 to 4 are changed into SOFT side. Consequently, oscillation-restraining energy can be made larger than the oscillation-stimulating energy transmitted to the sprung member. Thus, it is possible to improve comfortableness to ride in and running stability.

From the six damping force characteristics of different damping coefficients, the fifth and sixth characteristics on the higher level side are selected when the sprung member is in the low frequency oscillation range, the first and second characteristics on the lower level side are selected when the sprung member is in the high frequency oscillation range, and the third and fourth characteristics on the medium level side are selected when the road is bumpy. The damping force characteristics of the shock absorbers 1 to 4 are changed depending on the value of the judging function hi between the above-mentioned two characteristics. Thus, it is possible to prevent noise and oscillation without greatly changing the damping force characteristics. In the low frequency oscillation range in which the vehicle is easily made unstable owing to disturbance such as steering, the characteristics on the higher level side are selected so that the stability can be improved. In the high frequency oscillation range in which road noise and the like are inputted at the time of straight running, the characteristics on the lower level side are selected so that the comfortableness to ride in can be improved. On the bumpy road, it is necessary to eliminate the shock caused by the thrust from the convex portions of the road surface. In addition, rollover and the like can easily be caused. However, the characteristics on the medium level side are selected so that the comfortableness to ride in and the stability can be ensured.

While the damping force characteristics of the shock absorbers 1 to 4 can be changed into six characteristics respectively in the above-mentioned embodiment, the present invention can also be applied to the case where the damping force characteristics of the shock absorbers 1 to 4 can be changed into four or more characteristics.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A suspension system for a vehicle comprising:

a shock absorber provided between a sprung member and an unsprung member for changing a damping force characteristic into four or more characteristics;

oscillation frequency range detecting means for detecting an oscillation frequency range of the sprung member of the vehicle;

road detecting means for detecting a road surface;

damping force characteristic limiting means for limiting the damping force characteristics to less than four characteristics, and for receiving signals from the oscillation frequency range detecting means and the road detecting means so as to limit the damping force characteristics of the shock absorber to a higher level side of the less than four damping characteristics when the sprung member is in a low frequency oscillation range, to a lower level side of the less than four damping characteristics when the sprung member is in a high frequency oscillation range, and to a medium level side of the less than four damping characteristics when the road surface is uneven; and damping force characteristics changing and controlling means for changing and controlling the damping force characteristic of the shock absorber on the basis of a given control rule to a characteristic within the damping force characteristics limited by the damping force characteristic limiting means.

2. A suspension system for a vehicle according to claim 1, wherein the control rule of the damping force characteristic changing and controlling means changes the damping force characteristic of the shock absorber to the higher level side of the less than four damping characteristics when the damping force of the shock absorber acts in an oscillation-restraining direction with respect to a vertical oscillation of the sprung member, and changes the damping force characteristic of the shock absorber to the lower level side of the less than four damping characteristics when the damping force of the shock absorber acts in an oscillation-stimulating direction with respect to the vertical oscillation of the sprung member.

3. A suspension system for a vehicle according to claim 2, further comprising:
sprung-member absolute speed detecting means for detecting a sprung-member absolute speed;
skyhook damper force calculating means for receiving a signal from the sprung-member absolute speed detecting means so as to calculate a skyhook damper force as a function value of the sprung-member absolute speed;
damping force detecting means for detecting the damping force of the shock absorber; and
judging means for receiving signals from the skyhook damper force calculating means and the damping force detecting means respectively and calculating the product of the skyhook damper force and the damping force of the shock absorber so as to quantitatively judge whether the damping force of the shock absorber acts in the oscillation-restraining direction or the oscillation-stimulating direction with respect to the vertical oscillation of the sprung member.

4. A suspension system for a vehicle according to claim 1, wherein the oscillation frequency range detecting means serves to continuously measure the absolute speed of the sprung member of the vehicle so as to detect the oscillation frequency range of the sprung member.

5. A suspension system for a vehicle according to claim 1, wherein the road detecting means serves to continuously measure the absolute speed of the sprung member of the vehicle so as to detect unevenness in the road surface depending on the variation of the absolute speed.

6. A suspension system for a vehicle according to claim 1, wherein the shock absorber includes:
a cylinder;
a piston unit inserted in the cylinder;
an orifice formed in the piston unit, said orifice having a throttle, and
an actuator for changing the throttling of the orifice into several positions.

7. A suspension system for a vehicle according to claim 6, wherein the actuator has:
a shaft rotatably provided in the piston unit;
a step motor for rotating the shaft at a predetermined angle;
a first orifice plate provided integrally and rotatably with the shaft at its lower end and having a plurality of round holes formed at equal intervals in a circumferential direction; and
a second orifice plate provided in the orifice and having a circular long hole corresponding to the round holes of the first orifice plate, the throttling of the orifice being changed into several positions by rotating the first orifice plate through the step motor and by changing the number of the round holes of the first orifice plate which are opposed to the long hole of the second orifice plate.

8. A suspension system for a vehicle according to claim 1, wherein the oscillation frequency range detecting means serves to continuously measure the absolute displacement of the sprung member of the vehicle so as to detect the oscillation frequency range of the sprung member.

9. A suspension system for a vehicle according to claim 1, wherein the road detecting means serves to continuously measure the relative displacement between the sprung member and the unsprung member so as to detect unevenness in the road surface depending on the variation of the relative displacement.

* * * * *